United States Patent
Andre (10) Patent No.: US 10,756,529 B2
(45) Date of Patent: Aug. 25, 2020

(54) UNDERWATER ELECTRICAL CONNECTION SYSTEM

(71) Applicant: SUPERGRID INSTITUTE, Villeurbanne (FR)

(72) Inventor: Aymeric Andre, Juan-les-Pins (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 0 days.

(21) Appl. No.: 16/341,515

(22) PCT Filed: Oct. 11, 2017

(86) PCT No.: PCT/FR2017/052804
§ 371 (c)(1),
(2) Date: Apr. 12, 2019

(87) PCT Pub. No.: WO2018/069651
PCT Pub. Date: Apr. 19, 2018

(65) Prior Publication Data
US 2019/0296538 A1  Sep. 26, 2019

(30) Foreign Application Priority Data

Oct. 14, 2016 (FR) .................................. 16 59962

(51) Int. Cl.
*H02G 15/14* (2006.01)
*H02G 15/188* (2006.01)
(Continued)

(52) U.S. Cl.
CPC ......... *H02G 15/188* (2013.01); *H01R 13/523* (2013.01); *H01R 31/02* (2013.01);
(Continued)

(58) Field of Classification Search
CPC ....................................................... H02G 15/14
(Continued)

(56) References Cited

U.S. PATENT DOCUMENTS 7,950,957 B1 * 5/2011 Yang .................. H01R 13/5205
439/578
8,097,807 B2  1/2012 Aue et al.
(Continued)

FOREIGN PATENT DOCUMENTS

CN  2687913 Y  3/2005
CN  2687914 Y  3/2005
(Continued)

OTHER PUBLICATIONS

Product Catalog, "Cable Accessories 52-420 kV," Abb, May 2015, 48 pages.
(Continued)

*Primary Examiner* — Stanley Tso
(74) *Attorney, Agent, or Firm* — Workman Nydegger (57) ABSTRACT

An undersea connection system for connecting together at least three high voltage or very high voltage undersea electric cables comprises an outer cage defining a connection space; and a connection fitting comprising a conductive connection electrode that presents a junction node from which there extend at least three branches. Each of the at least three branches of the conductive electrode includes a male terminal portion that is connected to a respective one of the electric cables in a connection zone about which there is mounted a connection sleeve made of pre-molded insulating material that receives, via its ends, firstly the male terminal portion of one of the branches of the conductive electrode, and secondly the connection end of one of the electric cables.

21 Claims, 5 Drawing Sheets

(51) Int. Cl.
  *H01R 13/523* (2006.01)
  *H01R 31/02* (2006.01)
  *H02G 15/184* (2006.01)
  *H02G 15/115* (2006.01)
  *H02G 15/113* (2006.01)

(52) U.S. Cl.
  CPC ........... *H02G 15/14* (2013.01); *H02G 15/184* (2013.01); *H02G 15/113* (2013.01); *H02G 15/115* (2013.01)

(58) Field of Classification Search
  USPC .......................................................... 174/21
  See application file for complete search history.

(56) References Cited

U.S. PATENT DOCUMENTS

| | | | | |
|---|---|---|---|---|
| 8,507,795 | B2* | 8/2013 | Karlstrand | H02G 15/14 174/84 R |
| 10,236,622 | B2* | 3/2019 | Jenkin | H01R 13/523 |
| 2011/0308857 | A1* | 12/2011 | Zapata | H01R 4/183 174/88 R |

FOREIGN PATENT DOCUMENTS

| | | | |
|---|---|---|---|
| CN | 2852156 | Y | 12/2006 |
| CN | 201303244 | Y | 9/2009 |
| CN | 201797290 | U | 4/2011 |
| CN | 201877773 | U | 6/2011 |
| EP | 0896409 | A2 | 2/1999 |
| EP | 1103094 | * | 5/2001 |
| EP | 1103094 | A1 | 5/2001 |
| EP | 2237380 | A1 | 10/2010 |
| GB | 781129 | A | 8/1957 |
| JP | S6173105 | A | 4/1986 |
| JP | 2001136651 | A | 5/2001 |
| JP | 2001169455 | A | 6/2001 |
| WO | 2013026480 | A1 | 2/2013 |

OTHER PUBLICATIONS

French Search Report from FR Application No. 1659962, dated Jun. 14, 2017.
International Search Report from PCT Application No. PCT/FR2017/052804, dated Jan. 18, 2018.
Search Report from corresponding EP Application No. 17794374.3, dated Jul. 7, 2020.

* cited by examiner

UNDERWATER ELECTRICAL CONNECTION SYSTEM

BACKGROUND

The invention relates to an undersea connection system for connecting together electrically in sealed manner at least three undersea electric cables capable of transporting electric current at high voltage or very high voltage, and in particular direct current (DC).

Transporting electrical energy by means of undersea cables, in particular when it takes place at high voltage DC or very high voltage DC, makes it possible to transport electricity over long distances in a marine environment and at high currents, and therefore at very high powers. In an electricity transmission network including undersea portions, it is often necessary to be able to interconnect a third offshore component to a link between two points that may already be in existence. For example, it may be desirable to connect an offshore wind farm to an electricity network that includes an undersea cable.

Nevertheless, making such a connection in a marine environment requires major constraints to be taken into account. The undersea connection system must be capable of withstanding hydrostatic pressure at the sea bottom without damaging the cable, and without allowing water to infiltrate into the electrical insulation system. The system must be capable of withstanding major mechanical stresses while it is being installed, while nevertheless being light in weight and compact. The connection needs to be capable of being installed quickly and it must benefit from reliability that is sufficient to enable it to operate over a very long lifetime, which may for example be at least 30 years.

SUMMARY

The invention finds a particularly pertinent application when the undersea cables for connecting together are of the type including extruded insulation.

Figure 1:
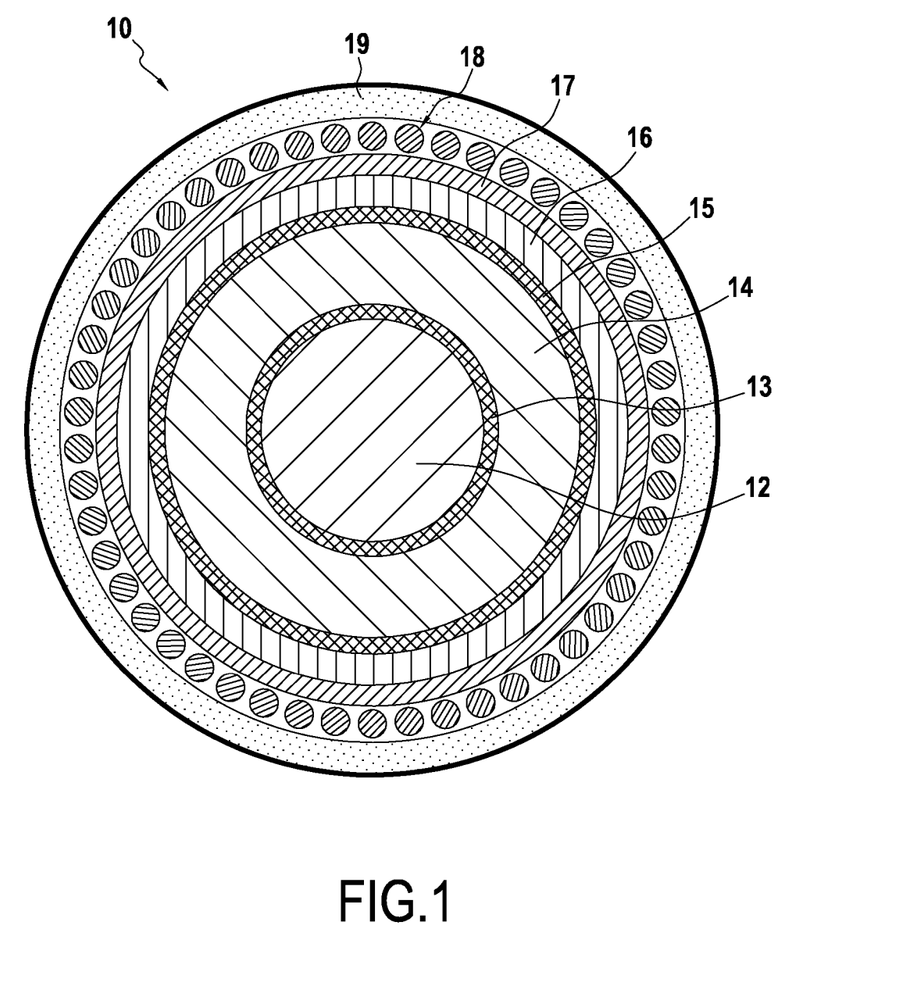
FIG. 1 is a cross-section view of an embodiment of an undersea electric cable suitable for being electrically connected by means of a system of the invention.

FIG. 1 shows an example of an undersea cable 10 with extruded insulation that is suitable for being used in a system of the invention. The cable 10 comprises a main conductor 12, which is generally in wire form, that is surrounded coaxially by at least one main insulating sheath 14, itself surrounded coaxially by a sealed screen sheath 16 that conducts electricity, itself surrounded coaxially by armor, e.g. metal armor 18. The main conductor 12 is the conductor that, in operation, conducts the operating current at the operating voltage.

The conductor 12 is made of a material that is a good conductor, e.g. a metal, in particular copper or aluminum or an alloy based on copper or aluminum. It may be solid, i.e. comprising a single piece across a section, it may be segmented into a plurality of segments across a section, in the form of optionally twisted strands, etc. . . . . . The cable 10 in this example is a single pole cable, thus in this sense it has only one main conductor. The cable 10 is therefore designed to propagate a single electric potential.

The main insulating sheath 14 is made by extruding an insulating polymer material, e.g. based on cross-linked polyethylene (XLPE). This insulating main sheath 14 may possibly comprise multiple layers, including in particular a plurality of different insulating materials, e.g. materials having different levels of electrical resistivity.

The sealed screen sheath 16 is generally electrically conductive. It is often made of metal, e.g. of lead or of lead alloy, and thus generally of a material that is a good conductor. It protects the main insulating sheath 14 and the conductor 12 from water. Its conductive nature also enables it to ensure that the electric field generated by the potential of the conductor 12 of the cable 10 is isotropic. The sealed screen sheath 16 may also be made by extrusion.

One of the functions of the armor 18 is to give the cable 10 mechanical strength, in particular traction strength, in particular in order to withstand the stresses to which it is subjected during installation. It also protects the internal layers that it surrounds from any mechanical stresses to which the cable might be subjected before, during, and after laying. The armor 18 is generally made in particular of metal, e.g. of copper, of stainless steel, or of steel. The armor 18 thus generally comprises one or more layers of metal strands, e.g. of round or prismatic section, generally arranged helically around the axis of the cable 10.

In addition to those main components, the cable 10 generally includes other components, in particular other layers that are arranged coaxially with the layers described above. Thus, between the conductor 12 and the main insulating sheath 14, it is possible to provide an internal screen layer 13 that is preferably a poor conductor, e.g. made of a polymer material filled with conductive particles. Between the main insulating sheath 14 and the sealed screen sheath 16, it is possible to provide an outer screen layer 15 that is preferably a poor conductor, e.g. being made of a polymer material filled with conductive particles. Between the sealed screen sheath 16 and the armor 18, it is possible to provide a protection layer 17, which may be a good conductor, a poor conductor, or an insulator. By way of example, it may be made of insulating polymer material, or on the contrary of polymer material filled with conductive particles so as to form a poor conductor. Furthermore, provision is generally made for the armor 18 to be surrounded coaxially by an outer protection sheath 19, e.g. made of polymer material.

In general manner, each of the above-mentioned components may be of the multilayer type and/or of the multi-material type.

In the present specification, a material or element is considered as being:
- a good conductor if it possesses resistivity of less than $10^{-6}$ ohm-meters ($\Omega \cdot m$);
- a poor conductor if it possesses resistivity lying in the range $10^{-6}$ $\Omega \cdot m$ to $10^{2}$ $\Omega \cdot m$; and
- an insulator if it possesses resistivity greater than $10^{14}$ $\Omega \cdot m$.

A material or an element is considered to be a conductor if it is a good conductor or a poor conductor.

One solution for connecting together two high voltage electric cables with extruded insulation is to make use of a pre-molded junction such as that described in patent document U.S. Pat. No. 8,097,807 B2. That type of junction generally comprises a connection sleeve having an outer tubular sleeve of insulating elastomer material, e.g. of ethylene-propylene copolymer (EPDM) or the equivalent, which is pre-molded so as to present a bore opening out at its two opposite axial ends. In the mounted position of the pre-molded junction, the outer tubular sleeve can thus receive via respective ends of the bore the two connection ends of two cables that are to be connected together. During assembly, the sleeve is prepositioned on one of the two cables for connecting together, thus being offset to one side relative to its future installed position. Beforehand, the two cables should have their metal screens and outer layers removed from their connection ends. The conductors of the two cables, which are stripped in a connection zone, are then connected together electrically. The outer tubular sleeve of the pre-molded junction is then slid along the cable from its prepositioning position until reaching an installed position in which it covers the connection zone between the conductors. That solution can be performed quickly and reliably since pre-molded junctions can be tested in the factory, in particular concerning their electrical insulation properties.

One solution for connecting together two high voltage undersea electric cables with extruded insulation by means of a pre-molded junction consists in encapsulating such a junction in a two-part metal cage, as described in patent document U.S. Pat. No. 8,507,795. For this purpose, the armor is mechanically connected to each end of said cage by means of a steel collar welded to each strand of the armor. Bend limiters are connected to the ends of the cage in order to limit the radius of the curvature of the cable and thus protect the cable from any excessive deformation.

Patent document GB781129 describes a solution for connecting together three high voltage electric cables making use:
  of an outer cage that defines a connection space, the cage having three cable-passing inlets each of which is provided for passing one of the electric cables to be connected together electrically; and
  of a connection fitting received in the connection space and comprising a conductive connection electrode that presents a junction node from which there extend at least three branches, each branch being for connecting electrically to the connection end of a respective one of the electric cables to be connected together electrically.

The connection fitting is embedded in an insulating layer constituted by a block of epoxy resin. The resin block may be applied by vacuum molding, by casting, or by injection molding. The metal screen is reconstituted by winding a copper tape. The connection of each of the three cables to the corresponding branch of the connection electrode is performed by welding or by crimping. For that purpose, each branch has a female terminal portion in which the connection end of the conductor is inserted. Those connections are insulated by manually winding a tape. Nevertheless, the time required for making a taped junction is long, and might be carried out poorly. Since that system does not relate to an undersea application, the mechanical stresses associated with an installation at sea are likewise not taken into account.

Another solution for connecting together three high voltage electric cables is described in patent CH 201 303 244(Y) making use of a connection fitting made up of a central metal electrode embedded in an insulating layer in the form of a block of epoxy resin. A conductive housing fitting closely to and surrounding the resin block acts as a metal screen. That is all embedded in a rigid outer cage. The metal electrode has three female cavities for connecting the connection ends of the cables. That solution relates to an application on land and it is not even suitable for use on ground that is saturated with rain water. Patent document CN 201 797 290(U) describes an improvement of that system where the assembly is encapsulated in a steel enclosure where sealing between the cable and the outer enclosure is provided by means of packing glands. That solution cannot be used for an undersea system since the sealing system is not adapted to the hydrostatic pressure that exists at the ocean floor. Furthermore, the outer enclosure is not designed to withstand mechanical stresses during installation. Finally, that solution is lengthy and complex to perform, given the large number of elements to be assembled together.

Other cable connection systems are described in the following documents: EP 2 237 380, JP-2001.136651, CN 2 687 913(Y), CN 2 687 914(Y), CN 201 877 773(U), CN 2 852 156(Y), and JP-S-61.73105(A), however those systems are not suitable for making an undersea connection for electrically connecting together in sealed manner three undersea electric cables.

Thus, the invention provides an undersea connection system for electrically connecting together in sealed manner at least three high voltage or very high voltage undersea electric cables, the system being of the type in which:
  each electric cable comprises a main conductor surrounded by at least one main insulating sheath, itself surrounded by metal armor; and
  each electric cable presents a connection end at which the main conductor presents a visible end that projects axially beyond the corresponding end of the main insulating sheath, and beyond an end of the metal armor;
and of the type in which the system includes:
  an outer cage that defines a connection space, the cage having cable-passing inlets for passing electric cables to be connected together electrically; and
  a connection fitting received in the connection space and comprising a conductive connection electrode that presents a junction node from which there extend at least three branches, each branch being for connecting electrically to the connection end of a respective one of the electric cables to be connected together electrically;
the system being characterized in that:
  each of said at least three branches of the conductive electrode includes a male terminal portion;
  each of said at least three branches of the electrode is electrically connected, inside the connection space, through the connection end of a respective one of the electric cables in a connection zone around which there is mounted a connection sleeve comprising an outer tubular sleeve of pre-molded insulating material that presents a bore opening out at its two opposite axial ends so as to receive, in the assembled position, via its respective ends firstly the male terminal portion of one of the branches of the conductive electrode, and secondly the connection end of one of the electric cables.

According to other characteristics of the invention that are optional, taken singly or in combination:

The connection sleeve may include axially in its center a conductive inner tubular sleeve that is radially flush with the inside of the inner bore.

The connection sleeve may include a conductive ring at each axial end.

The connection fitting may include an insulating layer that surrounds the junction node of the electrode and outside of which the male terminal portions of said at least three branches of the electrode emerge so as to be visible.

The insulating layer that surrounds the junction node of the electrode may be made by molding a polymer material.

The insulating layer that surrounds the junction node of the electrode may be covered at least in part in an electrically conductive layer.

The insulating layer that surrounds the junction node may include ramifications that extend around an upstream portion of each branch of the conductive electrode and each of which is engaged in the inner bore of a respective one of the connection sleeves.

The end of the main insulating sheath of each of the electric cables may be engaged in the bore of a respective one of the connection sleeves.

The connection electrode may be made by molding a conductive material.

The main insulating sheath of the electric cables to be connected together may be an extruded sheath.

The electric cables to be connected together may include an electrically conductive sealed screen sheath between the main insulating sheath and the metal armor, the system may include a conductive screen covering that encapsulates in sealed manner the junction fitting and each of the connection sleeves respectively surrounding the connection zones of each of said at least three branches of the electrode, and the covering may be connected in sealed and electrically conductive manner with the sealed screen sheaths of the electric cables to be connected together.

The conductive screen covering may comprise a conductive screen shell encapsulating the junction node of the connection fitting, and, for each connection sleeve, a conductive sealed screen capsule that is arranged around the connection sleeve and that, at an axial end of the sleeve, is connected in sealed and electrically conductive manner with the sealed screen sheath of the corresponding electric cable, and, at the other axial end of the sleeve, is connected in sealed and electrically conductive manner with the conductive screen shell.

The sealed screen shell that encapsulates the junction node of the connection fitting may be pre-formed prior to assembling the junction system.

The armor of each electric cable for connecting together may be mechanically connected to the outer cage of the system.

The armor of each electric cable for connecting together may be mechanically connected to the outer cage of the system at the corresponding cable-passing inlet.

The outer cage may be electrically conductive, and the armor of each electric cable may be mechanically and electrically connected to the outer cage of the system.

The system may include a bending limiter for limiting bending of the electric cable at each cable-passing inlet of the outer cage.

The cable bending limiter may include a cable guide tube made of elastomer material that is mechanically connected to the outer cage that extends outside it, and that presents a through inner bore extending axially along the axis of the tube, one axial end of the tube being arranged facing the cable-passing inlet.

The outer cage may be made from at least two portions, each portion having at least one cable-passing inlet, and the two portions may be mechanically connected together.

The two portions of the outer cage may be electrically conductive and are electrically connected to each other.

BRIEF DESCRIPTION OF THE DRAWINGS

Various other characteristics appear from the following description made with reference to the accompanying drawings, which show embodiments of the invention as non-limiting examples.

DETAILED DESCRIPTION OF VARIOUS EMBODIMENTS

Figure 2:
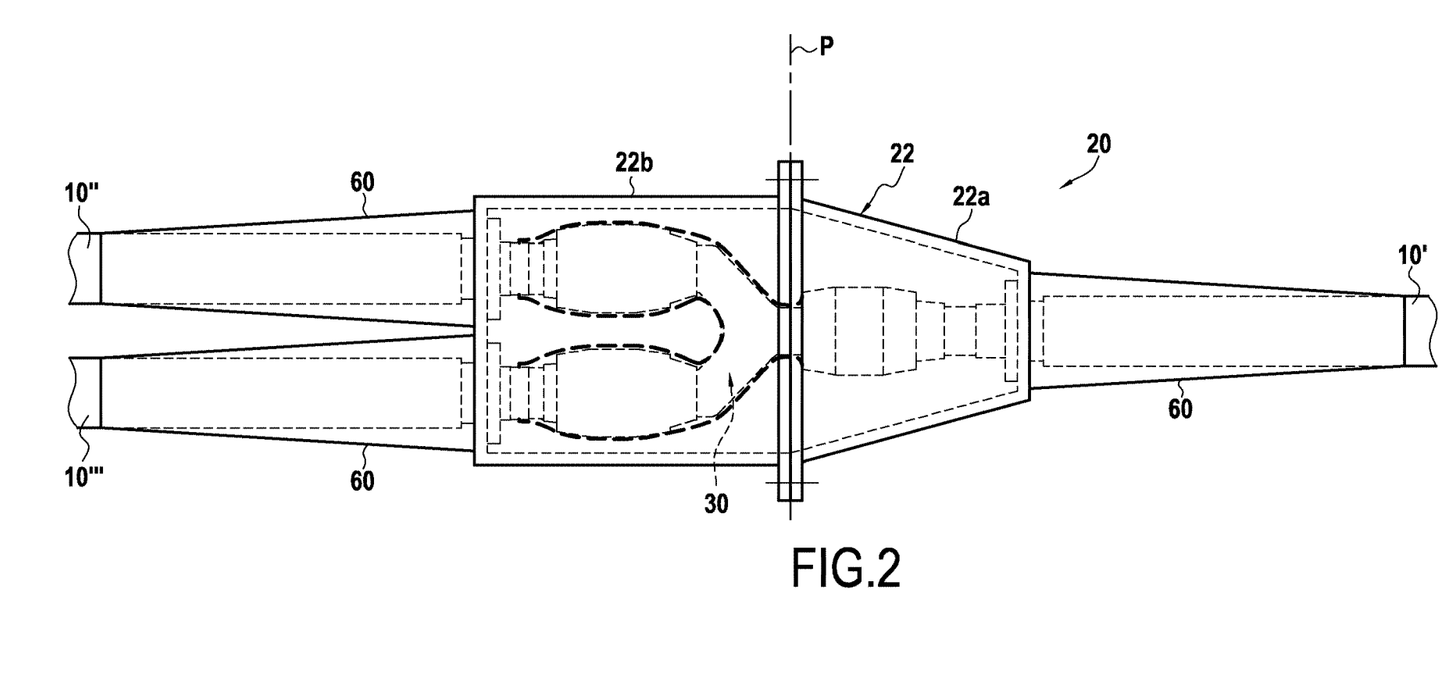
FIG. 2 is a diagrammatic outside view of an embodiment of a system of the invention.

FIG. 2 is a diagram showing an undersea connection system 20 for undersea electric cables, in particular undersea electric cables for high voltage or very high voltage electric circuits. Such a system is for electrically connecting together in sealed manner at least three undersea electric cables, e.g. a first cable 10', a second cable 10", and a third cable 10''', that are intended for conveying nominal currents, i.e. established currents, at a voltage higher than 1000 volts (V) alternating current (AC) or 1500 V DC, or even at very high voltage, i.e. a voltage higher than 50,000 V AC or 75,000 V DC. The invention is described more particularly in the context of high or very high voltage DC. The connection system of the invention needs to be capable of conveying electricity at nominal currents in service that may reach several hundreds of amps, or indeed one thousand amps or more.

In the example shown, the connection system is designed for connecting only three high voltage electric cables. Nevertheless, the invention also covers connection systems for connecting together four, five, or more high voltage electric cables, insofar as such systems are designed specifically for at least three electric cables, together with additional connection means for additional cables above three, which may in particular be replicated from connection elements as described for each of the three connections in the examples shown.

In the example shown, the connection system 20 is designed for a connection having a Y-shaped geometrical configuration, with the two branches of the Y-shape being parallel. At the outlet from the connection system, each of the cables presents a respective axial direction A', A", A''', the three axial directions defining the geometrical configuration of the connection system. The connection could be implemented with a T-shaped configuration, or a star configuration having three branches at 120°, etc. . . . . In the example shown, the axial directions A', A", A''' of the cables for connecting together are coplanar, however non-coplanar configurations are also possible.

It should be observed that the drawings are diagrammatic, and that in order to accommodate constraints associated with high voltage and/or very high voltage, care should be taken to avoid sharp angles.

In the description below, each of the three cables is of the type described in the introduction of the present application with reference to FIG. 1. They are thus cables designed for high voltage DC or very high voltage DC, each presenting an extruded main insulating sheath 14. Nevertheless, the three cables are not necessarily all identical, whether in structure, or in the materials of the various components of each cable, or in the electrical dimensioning of each of the components of the cable.

Nevertheless, each of the electric cables has a main conductor 12, which is a good conductor, that is surrounded by at least one main insulating sheath 14, itself surrounded by metal armor 18. In the example shown, each of the electric cables also presents, between the main insulating sheath 14 and the metal armor 18, a sealed screen sheath 16 that conducts electricity. Furthermore, between the sealed screen sheath 16 and the armor 18, there is provided a protection layer 17, that may be a good conductor, a poor conductor, or an insulator. These components may be as described above in the introduction to this application. The cables may include other components.

Figure 3:
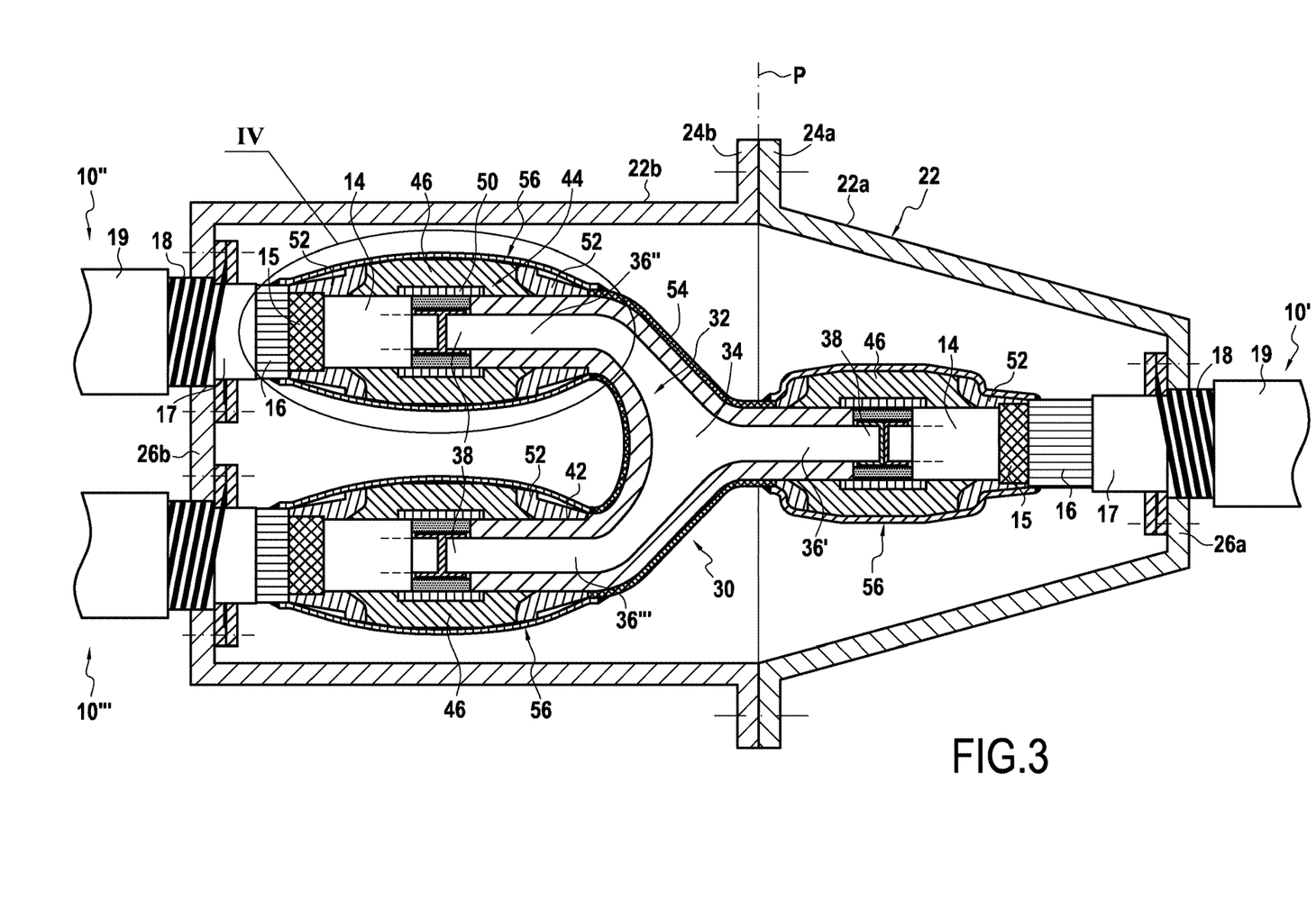
FIG. 3 is a diagrammatic fragmentary section view on a longitudinal plane showing the main components of an embodiment of a system of the invention.
Figure 4:
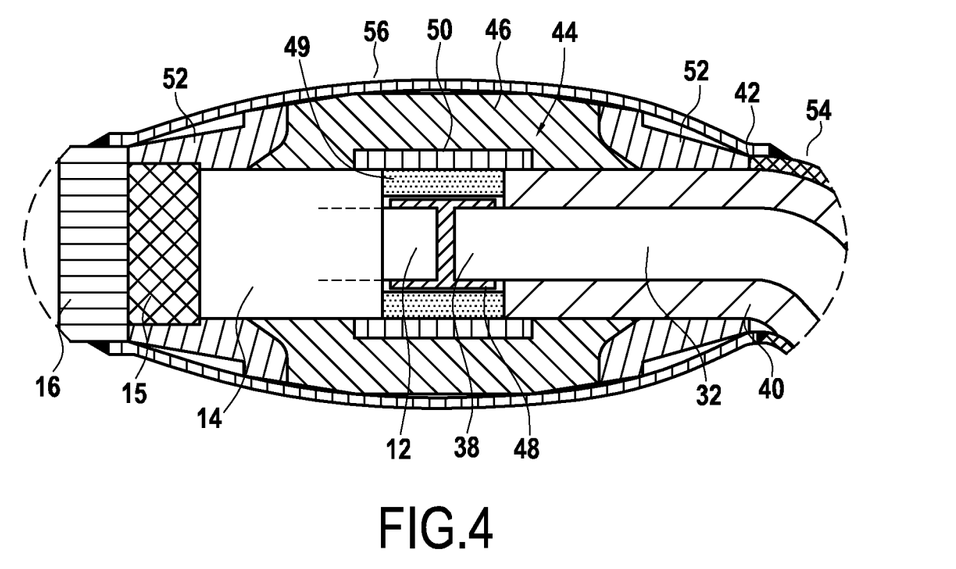
FIG. 4 is another diagrammatic view in the form of another fragmentary section view on a longitudinal plane showing a detail of the view IV shown in FIG. 3, illustrating a connection of one of the cables by means of a pre-molded junction in an embodiment of a system of the invention.

As can be seen in particular in FIGS. 3 and 4, each of the electric cables 10', 10", 10'" for connecting together presents a connection end where the main conductor 12 presents a visible end that projects axially from a corresponding end of the main insulating sheath 14 and from an end of the metal armor 18. For this purpose, in order to make a connection in accordance with the invention, the various components that surround the conductor 12 are removed over a certain length. In known manner, these various components that surround the conductor 12 are thus removed over staged lengths. By way of example, and when considering a cable in isolation, this serves to reveal in succession: a visible end of the conductor 12; a visible end of the main insulating sheath 14; a visible end of the outer screen layer 15; a visible end of the protection layer 16; and a visible end of the armor 18.

The connection system 20 of the invention includes an outer cage 22 that defines a connection space. In the embodiment shown, the outer cage 22 constitutes the outermost portion of the connection system 20. This outer cage 22 is generally made essentially out of metal materials, e.g. out of steel. It may be covered in paint, varnish, a coating, or a layer of protective material. As described below, this outer cage 22 is advantageously made as two portions 22a and 22b, and it constitutes a protective housing for the junction elements situated inside it, and it also constitutes a first barrier against penetration of water and of marine microorganisms, even if the outer cage 22 is not itself necessarily sealed. The outer cage 22 provides the mechanical rigidity and strength needed to enable the system 20 to be installed in deep water.

The outer cage 22 has cable-passing inlets designed to pass the electric cables to be connected together electrically so that the connection ends of the cables can be received inside the connection space. In the example shown, there are as many cable-passing inlets as there are electric cables to be connected together, each cable-passing inlet receiving only one of the electric cables to be connected together.

By way of example, the outer cage 22 may be made in the form of two half-shells 22a and 22b, each half-shell being closed on all of its sides except in a junction plane P. In this junction plane P, each half-shell 22a, 22b presents an opening that is defined by a peripheral bearing edge, the two peripheral bearing edges of the two half-shells being designed to bear against each other, preferably around a closed and continuous outline in order to provide a degree of sealing. At this peripheral bearing edge, the half-shells may have complementary collars 24a and 24b that enable the two half-shells to be assembled together, e.g. by means of bolts and/or by welding and/or any other assembly means. Once they have been assembled in this way, the two half-shells 24a and 24b define the connection space that is preferably closed, apart from the cable-passing inlets.

In the example shown, each half-shell 22a, 22b presents an end wall 26a, 26b opposite from the peripheral bearing edge. For example, the end walls may be parallel to each other and may form opposite ends of the outer cage 22. In the example shown, a first half-shell 22a includes one inlet in its end wall 26a for passing the first electric cable 10', while the second half-shell 22b includes two inlets in its end wall 26b for passing respectively the second electric cable 10" and the third electric cable 10'".

Figure 5:
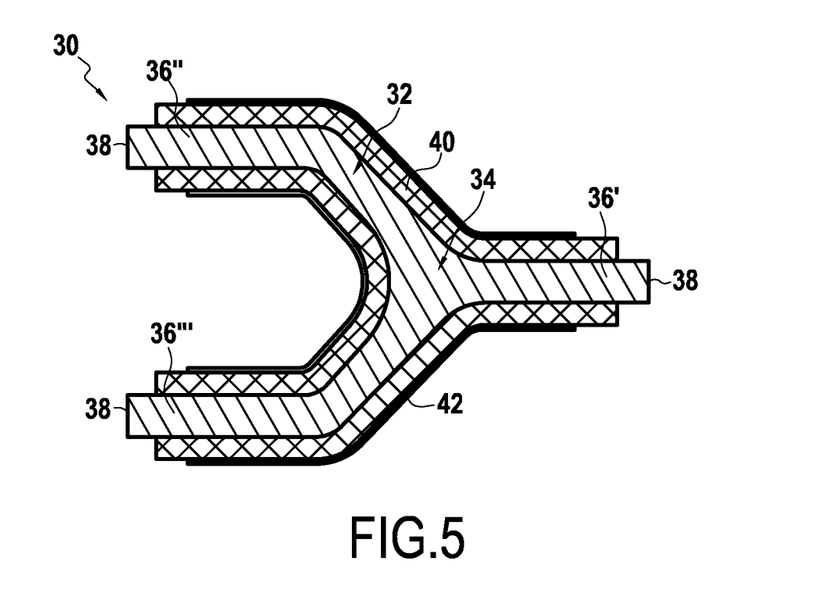
FIG. 5 is a diagrammatic section view of an embodiment of a connection fitting for a system of the invention.

At the core of the connection system of the invention, inside the connection space, there is a connection fitting 30 that is shown more particularly in section and in isolated manner in FIG. 5.

The connection fitting 30 comprises a conductive connection electrode 32 that presents a junction node 34 from which there extend three branches 36', 36", 36'", with each branch being for connecting electrically to the connection end of a respective one of the electric cables 10', 10", 10'" for connecting together electrically. The junction node 34 provides electrical continuity between the branches 36', 36", 36'" of the electrode 32.

The electrode 32 is preferably made of a material that is a good conductor, in particular a metal material, e.g. copper or aluminum or an alloy based on copper or aluminum. The electrode 32 performs the same function as the conductor in an electric cable. It may thus be made using the same techniques and/or the same materials. The electrode 32 is advantageously a single part, e.g. being molded as a single part. Nevertheless, it could be made up of a plurality of parts that are connected together electrically. The conductive connection electrode 32 provides electrical continuity between the main conductors 12 of the electric cables 10', 10", 10'" that are for connecting together electrically.

In the example shown, it presents a Y shape corresponding to the overall configuration of the connection system. Each of the three branches 36', 36", 36'" of the conductive electrode has a male terminal portion 38. In the example shown, each of the branches is substantially cylindrical, and its male terminal portion determines an axial orientation for the branch.

The connection fitting 30 includes an insulating layer 40 that surrounds the junction node 34 of the electrode 32. The male terminal portions 38 of the three branches of the electrode emerge and become visible outside the insulating layer. These male terminal portions 38 that emerge preferably present a length that is analogous to the length of the visible end of the conductor of an electric cable 10 for connecting together. In the embodiment shown, the insulating layer 40 presents at least three ramifications, which extend from the junction node 34 around upstream portions of the branches 36', 36", 36'", but not including the male terminal portions 38 of the three emerging branches of the electrode where they are visible. Preferably, the insulating layer 40 that surrounds the junction node 34 of the electrode 32 is made by molding a polymer material. By way of example, it may be made of a material of EPDM type, or of silicone type.

In the example shown, on the insulating layer 40 that surrounds the junction node 34 of the electrode 32, including on its ramifications, the connection fitting 30 presents an electrically conductive layer 42 that covers the insulating layer. This layer 42 preferably presents properties analogous to those of the outer screen layer 15 of the electric cables to be connected together. Thus, it is preferably a poor conductor. By way of example, the conductive layer 42 that covers the insulating layer 40 of the connection fitting 30 may be made of polymer material filled with conductive particles. For example, it may be made by being molded around the insulating layer 40. Nevertheless, the conductive layer 42 does not cover the insulating layer 40 of the connection fitting 30 completely, and on the contrary it leaves visible ends of the insulating layer 40 uncovered in downstream portions of the branches 36', 36", 36'".

The connection fitting 30, comprising the electrode 32, the insulating layer 40, and optionally the conductive layer 42, is a part that is prefabricated prior to assembling the connection system.

In the example shown, the axial orientations of the branches 36', 36", 36''' of the connection electrode 32 correspond to the three axial directions A', A", A''' defining the geometrical configuration of the connection system.

In a connection system of the invention, each of the three branches of the electrode is for connecting electrically inside the connection space defined by the outer cage 22 with the connection end of a respective one of the electric cables 10', 10", 10''' for connecting together. For this purpose, each connection end of an electric cable for connecting together is presented with its axial direction in alignment with the axial direction of the corresponding branch of the electrode, such that the male terminal portion 38 of each branch 36', 36", 36''' of the connection electrode and the connection end of each cable, in particular the visible end of the conductor 12, face each other end to end.

In a connection system of the invention, each of the connections between the connection end of a cable for connecting together and the male terminal portion 38 of the corresponding branch 36', 36", 36''' of the connection electrode 32 is made by using a pre-molded junction, e.g. of a type analogous to that described in patent document U.S. Pat. No. 8,097,807 B2.

Specifically, each of the connections between the connection end of a cable for connecting together and the male terminal portion 38 of the corresponding branch 36', 36", 36''' presents a connection zone that corresponds in the appropriate axial direction to the length occupied in particular by the male terminal portion 38 and by the visible end of the conductor 12 facing it end to end and that are connected together electrically. More precisely, the connection zone corresponds to the end zones of the cables for connecting together in which the conductor 12 does not have its main insulating sheath 14 and to the end zones of the branch of the connection electrode 32 that do not have the insulating layer 40.

A pre-molded junction makes use of a connection sleeve 44 comprising an outer tubular sleeve 46 made of pre-molded insulating elastomer material that presents a bore opening out at its two opposite axial ends. In the assembled position, the connection sleeve 44 is arranged around the connection zone so as to provide electrical insulation that is preferably analogous to the electrical insulation provided by the main insulating sheath 14 of the cable 10 or by the insulating layer 40 of the connection fitting 30. In the assembled position, the inner bore of the connection sleeve receives through respective ends: firstly the male terminal portion 38 of one of the branches of the conductive electrode; and secondly the connection end of one of the electric cables. More precisely, this bore receives the end zone of the cable for connecting together in which the conductor 12 is not covered by its main insulating sheath 14 and the end zone of the branch of the connection electrode that is not covered by the insulating layer 40. The outer tubular sleeve 46 presents an axial length that is longer than the length of the connection zone. Specifically, as can be seen in particular in FIG. 4, the outer tubular sleeve 46 of insulating elastomer material extends along the axial direction so as to cover not only the connection zone, but also in such a manner that one of its ends covers at least part of the visible end of the main insulating sheath 14 of the cable 10, while the other one of its ends covers one end of a corresponding ramification of the insulating layer 40 of the connection fitting 30. For each connection between the connection fitting 30 and a cable for connecting together, the ramification of the insulating layer 40 thus presents an end that is engaged in the inner bore of the corresponding connection sleeve. Likewise, for each connection between the connection fitting and a cable for connecting together, the end of the main insulating sheath 14 of the electric cable is engaged in the bore of the corresponding connection sleeve 30.

Thus, the outer tubular sleeve 46 provides continuity of electrical insulation at the connection zone.

The inside diameter defined by the connection sleeve 44, and in particular by its outer tubular sleeve 46, is substantially equivalent to or preferably very slightly less than the outside diameter of the main insulating sheath 14 of the cable, and the outside diameter of the end of the corresponding ramification of the insulating layer 40 of the connection fitting 30. This serves in particular to guarantee a tight fit for the connection sleeve on the main insulation so as to guarantee continuity of electrical insulation better. Since the outer tubular 46 is made of elastomer material, e.g. of EPDM type or of silicone type, the diameter of its bore can adapt to a certain extent by deforming elastically to the diameter of the main insulating sheath 14 and/or of the insulating layer 40.

The electrical connection with the conductor 12 and the male terminal portion 38 of the electrode 32 is made by any means known in the field of pre-molded junctions. Thus, this electrical connection may be made by welding. In the example shown, a conductive tubular crimping bushing 48 is provided, e.g. made of metal, and into which the conductor 12 and the male terminal portion of the electrode are engaged, with the bushing then being crimped both on the conductor 12 and also on the male terminal portion 38. At both ends, such a connection provides both a mechanical connection and an electrical connection. Other connection means could be provided, e.g. such as winding a conductive tape, e.g. a tape made from a metal mesh. In the example shown, it can be seen that the bushing 48 is received in a space that extends radially in the connection zone between the conductor 12 and the inner bore of the connection sleeve 30. In known manner, this space may be filled in with a filler material or a ring 49 made of conductive material, preferably a good conductor.

In the example shown, the connection sleeve 44 has a conductive inner tubular sleeve 50 that extends coaxially at the center of the outer tubular sleeve 46. In the example shown, the inner tubular sleeve 50 is radially flush with the inside of the inner bore in the connection sleeve. The inside diameter of the inner tubular sleeve 50 may be less than the inside diameter of the outer tubular sleeve 46. The inner tubular sleeve 50 is preferably a poor conductor. In particular, it may be an element that is made of polymer material filled with conductive particles. In certain embodiments, the inner tubular sleeve 50 may be a part that is distinct from the outer tubular sleeve 46. Under such circumstances, this distinct part may be received in a setback provided in the inside diameter of the outer tubular sleeve 46. Nevertheless, and advantageously, the inner tubular sleeve 50 may be made together with the outer tubular sleeve 46 as a single part, the inner tubular sleeve then corresponding to a zone of that single part in which the elastomer material is filled with conductive particles.

It should be observed that the diameters of the main insulating sheath 14 of the cable 10 and of the insulating layer 40 are not necessarily equal, and/or the diameters of the main conductor 12 of the cable 10 and of the male terminal portion 38 of the electrode 32 are not necessarily equal. Under such circumstances, the connection sleeve 44 is adapted so as to present two axial portions having matching diameters.

In the example shown, at each axial end, the connection sleeve 44 has a conductive ring 52 that, like the inner tubular sleeve 50, may be made in the form of a separate fitted part or of a part that is integral with the outer tubular sleeve 46. The conductive rings 52 extend the inner bore formed by the outer tubular sleeve 46 axially. One of them can come into electrical contact with the outer screen layer 15 of the corresponding cable for connecting together, and the other with the conductive layer 42 covering the insulating layer 40 of the connection fitting 30. In known manner, these conductive rings 52 serve to control electric fields. The conductive rings 52 are preferably poor conductors; by way of example they may be made of polymer material filled with conductive particles.

In the example shown, each of the electric cables 10', 10", 10''' for connecting together has a sealed screen sheath 16, e.g. made of lead or lead alloy, that serves to protect the main insulating sheath 14 and the conductor 12 from water and that serves to make uniform the radial electric field generated by current being conveyed in the conductor 12 of the cable 10.

In order to provide continuity for this function through the connection system, the connection system includes a conductive sealed screen covering 54, 56 that encapsulates in sealed manner the connection fitting 30 and each of the connection sleeves 44 respectively surrounding the connection zone of each of said three branches of the electrode 32. This sealed screen covering is connected in sealed and electrically conductive manner with the sealed screen sheath 16 of each of the electric cables 10', 10", 10''' for connecting together. The sealed screen covering is preferably received entirely in the connection space defined by the outer cage 22. It defines an inside volume that is sealed relative to the remainder of the connection space. This sealed screen covering naturally includes cable-passing inlets that serve to pass the electric cables to be connected together electrically so that the connection ends of the cables can be received inside the inside volume. Preferably, there are as many cable-passing inlets as there are electric cables to be connected together, each cable-passing inlet receiving only one of the electric cables to be connected together.

The sealed screen covering preferably presents electrical properties that are analogous to those of the sealed screen sheath 16 of the cables for connecting together. By way of example, it may be made of metal, e.g. out of lead or a lead alloy, and preferably out of a material that is a good conductor.

The sealed screen covering may be made in the form of a part made up of only two portions that are separated in a junction plane, e.g. the plane of FIGS. 3 and 4.

Nevertheless, in the embodiment shown, the sealed screen covering is made up of a plurality of sections, each section possibly being made up of a plurality of portions. Each section defines a portion of the inside volume of the sealed screen covering, these portions being connected to one another.

Figure 6:
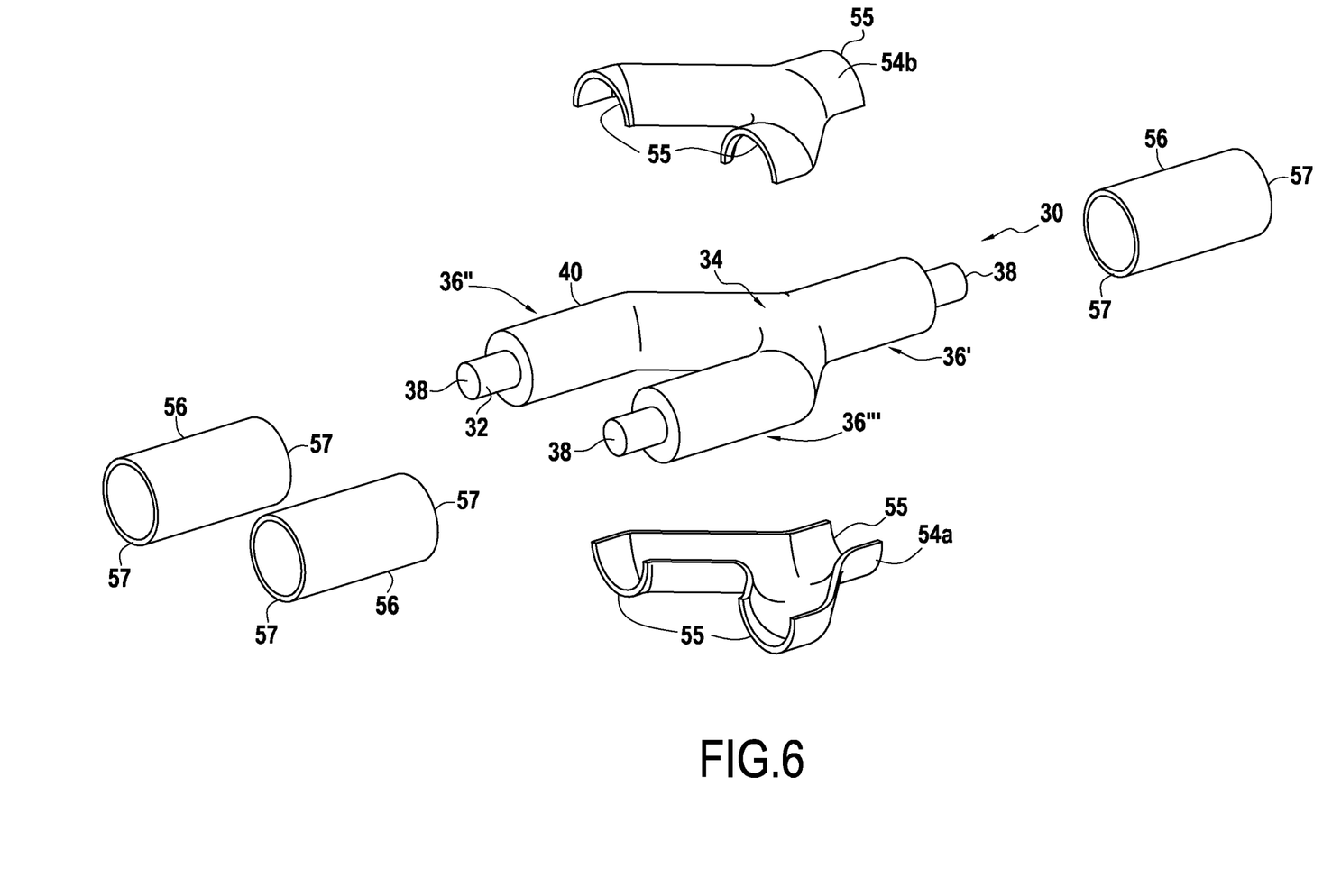
FIG. 6 is a diagrammatic perspective view of an embodiment of a connection fitting for a system of the invention together with components of a sealed screen shell for a system of the invention.

Thus, in the example shown, the screen covering comprises firstly a section in the form of a conductive sealed screen shell 54 that encapsulates in sealed manner the junction node 34 of the connection fitting 30. The sealed screen shell 54 defines a portion of the inside volume of the sealed screen covering. This shell is a hollow part, e.g. made up of two portions 54a and 54b that may be symmetrical on either side of a junction plane, e.g. the plane of FIGS. 3 and 4 containing the axial orientations of the branches 36', 36", 36''' of the connection electrode 32. In the example shown, each sealed screen shell 54 is of a shape complementary to the shape of the connection fitting 30, specifically a Y-shape. Preferably, the sealed screen shell 54 is in contact without leaving any gap with the outer surfaces of the connection fitting 30.

For each connection sleeve 44, the sealed screen covering also has a section in the form of a conductive sealed screen capsule 56, preferably made of a good conductor, e.g. a metal, that is arranged around the connection sleeve 44 and that is connected at one axial end of the sleeve 44 in sealed and electrically connective manner with the sealed screen sheath 16 of the corresponding electric cable 10', 10", 10''', and at the other axial end of the sleeve 44 it is connected in sealed and electrically conductive manner with the sealed sleeve shell 54.

In the example shown, each sealed screen capsule 56 is of a shape that is complementary to the shape of the connection sleeve 44, specifically in the shape of a barrel having two openings 57, one at each axial end. By way of example, each sealed screen capsule 56 is a hollow part. Preferably, each sealed screen capsule 56 is in contact without any gap with the outer surfaces of the connection sleeve 44. A first of the axial openings 57 is a circular opening for surrounding the sealed screen sheath 16 of the corresponding cable 10', 10", 10''' for connecting together. This axial opening may be connected in sealed manner with the sealed screen sheath 16, e.g. by means of a circular weld around the sealed screen sheath 16. The opposite, second axial opening 57 is designed to co-operate with a corresponding interface zone of the sealed screen shell 54. For this purpose, each sealed screen capsule 56 may be a part that is initially cylindrical and tubular with its axial openings 57, at the time of installation, being deformed radially, as by crimping, so as to come into contact respectively with the sealed screen sheath 16 and with the corresponding interface zone of the sealed screen shell 54.

Specifically, the sealed screen shell 54 has three interface zones 55 where it is connected in sealed and electrically conductive manner with the three respective sealed screen capsules 56 that co-operate with the sealed screen shell 54 to form the sealed screen covering. The connections may be made for example by welding. By way of example, the interface zones are formed by respective circular contact surfaces 57, 55 of the corresponding capsule 56 and of the shell 54.

Each sealed screen capsule 56 defines a portion of the inside volume of the sealed screen covering that is connected at the corresponding interface zone with the portion of the inside volume defined by the sealed screen shell 54.

The sealed screen shell 54 is preferably pre-formed before assembling the junction system. By way of example, it may be made by molding, by stamping, or by forging. The same applies to the sealed screen capsules 56.

Furthermore, provision is advantageously made for the armor 18 of each electric cable to be mechanically connected to the outer cage 22 of the system. This serves to avoid the mechanical forces to which the cables 10', 10", 10''' are subjected, be that during installation or while in service, running the risk of compromising the electrical connection between the conductors of the cables.

In the example shown, the armor 18 of each electric cable 10', 10", 10''' is mechanically connected to the outer cage 22 of the system at the corresponding cable-passing inlet. For example, a collar 58 is provided for each cable to surround the cable and be mechanically connected to the armor 18.

This connection may comprise welding. It may also comprise a connection by clamping strands of the armor 18 between two portions of the collar 58. In the example shown, the collar is shown as being received inside the connection space defined by the cage 22. It could also be arranged outside the cage. Nevertheless, it is arranged outside the volume defined by the sealed screen covering. The collar 58 is also fastened to the cage 22. In this example, this fastening is provided around the corresponding cable-passing inlet. This fastening may be provided by bolts, e.g. distributed all around the circumference of the cable-passing inlet. This fastening could comprise welding. The connection between the armor and the collar 58 and/or the fastening of the collar 58 to the cage 22 may be performed in the manner described in Document U.S. Pat. No. 8,507,795.

Furthermore, the armor 18 of each electric cable 10', 10", 10''' for connecting together is electrically connected to the outer cage 22 of the system so that the outer cage 22 provides continuity of the electrical function of the armor 18. Thus, the armor 18 of each electric cable is connected mechanically and electrically to the outer cage of the system. Insofar as the outer cage 22 is made up of two or more portions 22a, 22b, provision is made for the two or more portions 22a, 22b of the outer cage 22 to be electrically conductive, preferably good conductors, and to be electrically connected to one another.

The electrical and mechanical connections between the armor 18 and the outer cage 22 preferably coincide, i.e. are provided by the same components. In the example shown, the electrical connection between the armor 18 of a cable 10', 10", 10''' and the outer cage 22 is preferably made through the collar 58 which provides the mechanical connection.

In the example shown, at each cable-passing inlet of the cage, the system includes a bending limiter 60 for limiting bending of the corresponding electric cable 10', 10", 10''', so as to avoid damaging the cable by excessive bending where it enters into the system.

In the example shown, the cable bending limiter 60 comprises a cable guide tube 60, which may be made of elastomer material, e.g. of EPDM or silicone type, and which is mechanically connected to the cage. The guide tube 60 extends outside the cage 22 and presents a through inner bore on the axis of the tube, one axial end of the tube being arranged facing the cable-passing inlet.

In the example shown, the diameter of the tube decreases on going away from its end that is fastened to the cage. It can thus be understood that the guide tube 60 surrounds and reinforces the cable in its portion that is situated immediately outside the outer cage 22 of the connection system. The degree of reinforcement decreases with decreasing diameter of the guide tube on going away from the outer cage along the direction of the cable 10', 10", 10'''. In a variant, a bending limiter could be provided that is arranged like the guide tube, outside the cage from the cable-passing inlet and around the cable, but that presents a shape that is analogous to the shape of a trumpet bell. Such a trumpet bell shape bending limiter may be made of polymer material or of metal.

Furthermore, in order to further strengthen electrical insulation, provision is advantageously made for the connection fitting 30 to be received inside an insulating block that is contained in the connection space. In the example shown, this insulating block is made by filling the connection space with an insulating material that covers the connection fitting 30 and the sealed screen shell 54, and preferably also all of the components contained in the connection space, including the connection sleeve 44 and the sealed screen capsules 56. This insulating material may be bitumen or an insulating polymer resin.

The invention is not limited to the examples described and shown since various modifications can be made thereto without going beyond its ambit.

The invention claimed is:

1. An undersea connection system for electrically connecting together in sealed manner at least three high voltage undersea electric cables,
   wherein each of the electric cables comprises a main conductor surrounded by at least one main insulating sheath, itself surrounded by metal armor; and
   wherein each of the electric cables presents a connection end at which the main conductor presents a visible end that projects axially beyond the corresponding end of the main insulating sheath, and beyond an end of the metal armor;
   wherein the system comprises:
   an outer cage that defines a connection space, the outer cage having cable-passing inlets for passing electric cables to be connected together electrically; and
   a connection fitting received in the connection space and comprising a conductive connection electrode that presents a junction node from which there extend at least three branches, each of the three branches being configured to connect electrically to the connection end of a respective one of the electric cables to be connected together electrically;
   wherein:
   each of said at least three branches of the conductive electrode includes a male terminal portion;
   each of said at least three branches of the conductive electrode is electrically connected, inside the connection space, to the connection end of a respective one of the electric cables by the male terminal portion being inserted into a respective female terminal portion within a connection zone around which there is mounted a connection sleeve comprising an outer tubular sleeve of pre-molded insulating material that presents a bore opening out at two opposite axial ends including a first end and a second end, so as to receive, in the assembled position, the male terminal portion of one of the branches of the conductive electrode in the first end, the first end forming the respective female terminal portion, and the connection end of one of the electric cables in the second end; and
   wherein the at least three high voltage undersea electric cables are configured to accommodate a voltage higher than 1000 volts (V) alternating current (AC) or 1500 (V) direct current (DC).

2. The undersea connection system according to claim 1, wherein the connection sleeve includes axially in its center a conductive inner tubular sleeve that is internally radially flush with the inside of the inner bore.

3. The undersea connection system according to claim 1, wherein the connection sleeve includes a conductive ring at each axial end.

4. The undersea connection system according to claim 1, wherein the connection fitting includes an insulating layer that surrounds the junction node of the electrode and outside of which the male terminal portions of said at least three branches of the electrode emerge so as to be visible.

5. The undersea connection system according to claim 4, wherein the insulating layer that surrounds the junction node of the electrode is made by molding a polymer material.

6. The undersea connection system according to claim 4, wherein the insulating layer that surrounds the junction node of the electrode is covered at least in part in an electrically conductive layer.

7. The undersea connection system according to claim 4, wherein the insulating layer that surrounds the junction node includes ramifications that extend around an upstream portion of each branch of the conductive electrode and each of which is engaged in the inner bore of a respective one of the connection sleeves.

8. The undersea connection system according to claim 4, wherein the end of the main insulating sheath of each of the electric cables is engaged in the bore of a respective one of the connection sleeves.

9. The undersea connection system according to claim 1, wherein the connection electrode is made by molding a conductive material.

10. The undersea connection system according to claim 1, wherein the main insulating sheath of the electric cables for connecting together is an extruded sheath.

11. The undersea connection system according to claim 1, wherein the electric cables to be connected together include an electrically conductive sealed screen sheath between the main insulating sheath and the metal armor, in that the system includes a conductive screen covering that encapsulates in sealed manner the junction fitting and each of the connection sleeves respectively surrounding the connection zones of each of said at least three branches of the electrode, and in that the covering is connected in sealed and electrically conductive manner with the sealed screen sheaths of the electric cables to be connected together.

12. The undersea connection system according to claim 11, wherein the conductive screen covering comprises a conductive screen shell encapsulating the junction node of the connection fitting, and, for each connection sleeve, a conductive sealed screen capsule that is arranged around the connection sleeve and that, at an axial end of the sleeve, is connected in sealed and electrically conductive manner with the sealed screen sheath of the corresponding electric cable, and, at the other axial end of the sleeve, is connected in sealed and electrically conductive manner with the conductive screen shell.

13. The undersea connection system according to claim 12, wherein the sealed screen shell that encapsulates the junction node of the connection fitting is pre-formed prior to assembling the junction system.

14. The undersea connection system according to claim 1, wherein the armor of each electric cable to be connected together is mechanically connected to the outer cage of the system.

15. The undersea connection system according to claim 1, wherein the armor of each electric cable to be connected together is mechanically connected to the outer cage of the system at the corresponding cable-passing inlet.

16. The undersea connection system according to claim 1, wherein the outer cage is electrically conductive, and in that the armor of each electric cable is mechanically and electrically connected to the outer cage of the system.

17. The undersea connection system according to claim 1, wherein it includes a bending limiter for limiting bending of the electric cable at each cable-passing inlet of the outer cage.

18. The undersea connection system according to claim 17, wherein the cable bending limiter includes a cable guide tube made of elastomer material that is mechanically connected to the outer cage that extends outside it, and that presents a through inner bore extending axially along the axis of the tube, one axial end of the tube being arranged facing the cable-passing inlet.

19. The undersea connection system according to claim 1, wherein the outer cage is made from at least two portions, each portion having at least one cable-passing inlet, and in that the two portions are mechanically connected together.

20. The undersea connection system according to claim 19, wherein the two portions of the outer cage are electrically conductive and are electrically connected to each other.

21. The undersea connection system according to claim 1, wherein the at least three high voltage undersea electric cables are configured to accommodate a voltage higher than 50,000 volts (V) alternating current (AC) or 75,000 (V) direct current (DC).

* * * * *